United States Patent [19]

Hayes et al.

[11] 4,358,182
[45] Nov. 9, 1982

[54] COMPOSITE WINDOW FOR A VEHICLE ENTRANCE DOOR

[75] Inventors: Robert B. Hayes, Everett, Wash.; Arturo Pompei, Turin, Italy

[73] Assignee: The Boeing Company, Seattle, Wash.

[21] Appl. No.: 270,074

[22] Filed: Jun. 3, 1981

[51] Int. Cl.³ .......................... G02B 7/18; B64C 1/14
[52] U.S. Cl. .................... 350/287; 244/129.3
[58] Field of Search .............. 350/286, 287, 258, 260, 350/263; 244/129.3, 121; 296/146; 362/326, 331, 337, 338, 340, 308, 311, 326–329, 343

[56] References Cited

U.S. PATENT DOCUMENTS

| 650,209 | 5/1900 | White | 350/260 |
| 1,678,479 | 7/1928 | Patten et al. | 350/286 |
| 1,683,951 | 9/1938 | Buttron | 350/287 |
| 1,808,208 | 6/1931 | David | 350/287 |
| 1,883,296 | 10/1932 | Johnson | 350/287 |
| 1,907,800 | 5/1933 | Harrington | 350/286 |
| 2,708,136 | 5/1955 | Norris | 350/287 |
| 3,038,756 | 0/0000 | Heimer | 296/146 |

FOREIGN PATENT DOCUMENTS 489362  1/1954  Italy ..................... 350/286

Primary Examiner—Jon W. Henry
Attorney, Agent, or Firm—Daniel T. Anderson; Bernard A. Donahue

[57] ABSTRACT

A composite window for a vehicle entrance door includes means for affording a downward view while the door is closed. The window includes an outer pane having two substantially parallel plane surfaces, an inner pane having a plane surface facing the outer pane and spaced therefrom. The opposite surface is formed with a prism which extends either partly or entirely over its surface. Additionally, the opposite surface of the inner pane may be provided with a concave surface forming a concave lens which enhances the effect of the prism.

5 Claims, 8 Drawing Figures

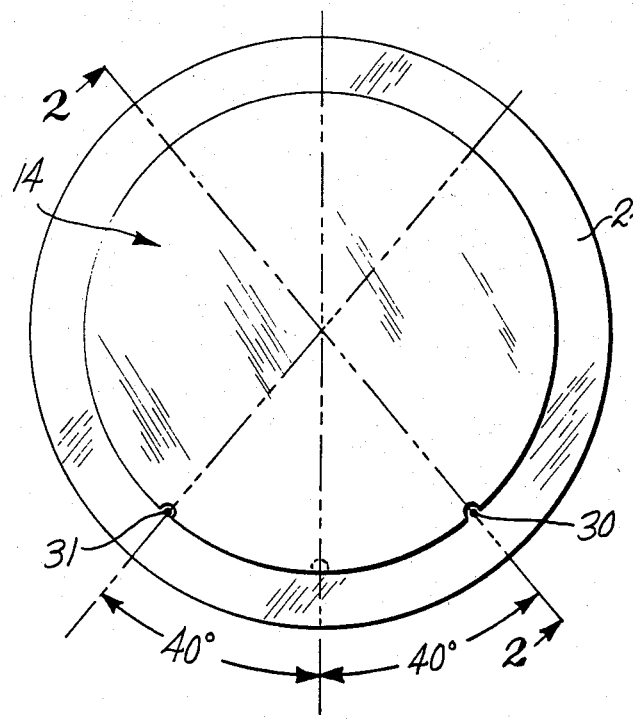
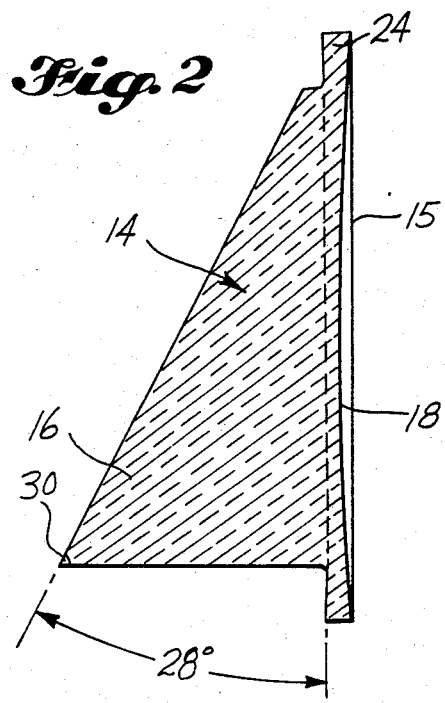
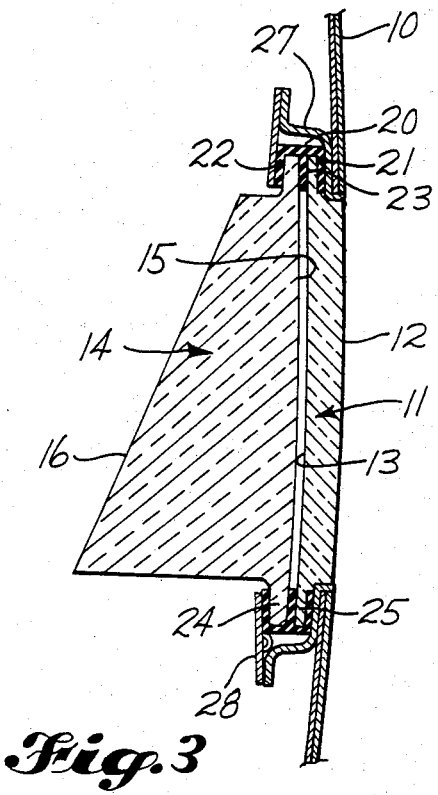

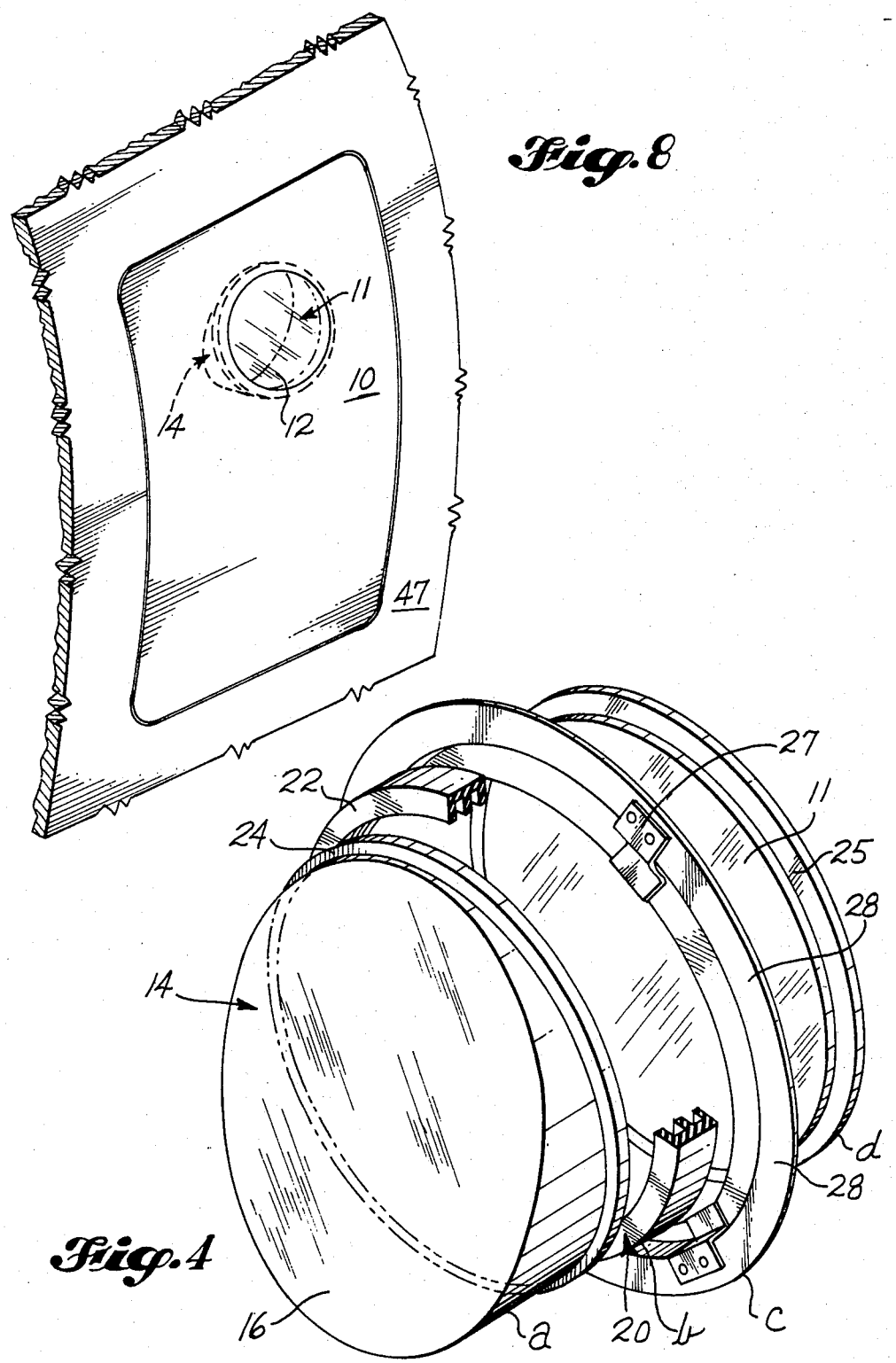

COMPOSITE WINDOW FOR A VEHICLE ENTRANCE DOOR

BACKGROUND OF THE INVENTION

It is frequently desirable to be able to provide a downward angle of view from the window of one or both of the entrance doors of a vehicle such as, for example, those of an airplane. This may be desirable for the purpose of observing the outside conditions of the ground close to the airplane without having to open the doors.

To that end, it has been proposed to enlarge the double panes of the window. However, it has been found that the critical downward angle of view is not thereby appreciably improved.

The patent to Norris, U.S. Pat. No. 2,709,136, discloses a prismatic window structure. This is intended for the window adjacent to an airplane passenger. Only a single window is provided and the prism is oriented in a horizontal direction to afford the passenger a better forward view. Therefore, the line of sight is essentially parallel to the fuselage. Thus, the proposed structure consists of a single window and the prism affords only a horizontal view for the passenger. The actual prism extends outside of the airplane and hence increases the wind resistance.

Various prisms have been proposed in connection with an automobile. An example is the patent to Patten et al., U.S. Pat. No. 1,678,479. The prism is disposed near the corner of the automobile windshield to overcome the blind spot created by the corner. To this end, prism strips may be put on the windshield. According to the patent to Buttron, U.S. Pat. No. 1,683,951, an adjustable prism was disposed horizontally near the windshield for observing traffic lights in the car. Similarly, the patent to Johnson, U.S. Pat. No. 1,883,296, discloses a prism which may be tilted in order to better observe traffic lights.

In lieu of a prism, the patent to Heimer, U.S. Pat. No. 3,038,756, suggests the use of two windows in the car, forming an angle with each other.

SUMMARY OF THE INVENTION

In accordance with the present invention, there is provided a composite window for an entrance door of a vehicle. When the vehicle is an airplane, it may, for example, include a forward and an aft entrance door. The window for the door includes an outer pane of transparent material having two substantially parallel and substantially plane surfaces.

The window further includes an inner pane of optically transparent material. The inner pane has a substantially plane surface facing the outer pane and spaced therefrom. The opposite surface of the inner pane has at least a portion forming a prism oriented to afford a view outside the airplane in a predetermined direction. Preferably the prism is oriented to afford a view substantially downward of the airplane. Further, the apical angle of the prism may be adjusted to suit different requirements; for example, the prim may be aligned for the forward door so that the line of sight is directed slightly rearwardly and for the aft doors the line of sight is directed somewhat forwardly. This will improve the viewing angle toward the engines and wind fuel cell area.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 1 is a front view of the composite window of the invention;

FIG. 2 is a sectional view taken on line 2—2 of FIG. 1;

FIG. 3 is a sectional view of the window of the invention, similar to that of FIG. 2 but illustrating a portion of the door and the sealing means for the composite window;

FIG. 4 is an exploded view of the inner pane, the outer pane, the seal and the metal frame;

FIG. 8 is a perspective view indicating an installation relationship of an example of the invention in an entrance door.

DESCRIPTION OF THE PREFERRED EMBODIMENT

Figure 5:
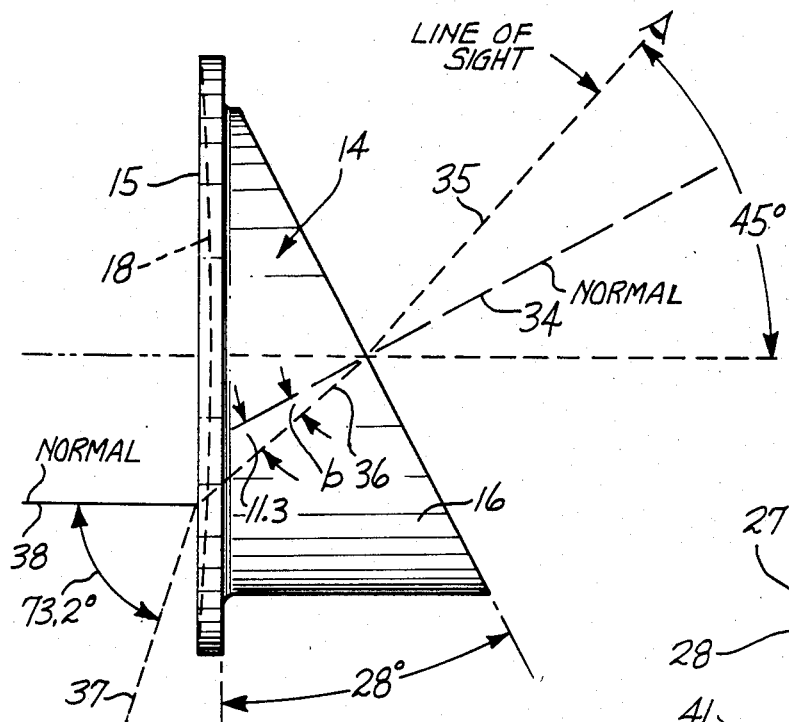
FIG. 5 is a schematic view similar to that of FIG. 2 but showing the optical path for a line of sight and respective angles.

Referring now to the drawings and particularly to FIGS. 1 through 4, there is illustrated, by way of example, a preferred embodiment of the present invention. Thus, there is shown in FIG. 3 a door structure 10 which may be the forward or aft entrance door of a vehicle such as, for example, an airplane. The door 10 may be slightly curved to better withstand the atmospheric pressure which may be higher in the airplane than outside. The composite window structure includes an outer pane 11 having two substantially parallel and plane surfaces 12 and 13 which may, for example, be circular in outline. There is further provided an inner pane 14 which also has a substantially plane surface 15 facing the outer pane 11 and spaced therefrom.

It is conventional practice to provide two spaced plane panes for airplane windows. This will minimize the effects of the pressure difference between the ambient atmosphere and the interior of the airplane. Further, the spacing between the panes serves as thermal insulation between the temperatures prevailing inside and outside of the airplane.

In accordance with the present invention, the opposite or inner surface of the inner pane 14 has the shape of a prism, as shown at 16. The operation and function of the prism 16 will be subsequently explained.

As shown particularly in FIG. 2, the inner surface 15 of the inner pane may be provided with a concave surface 18 which forms a concave or negative lens. The lens with the surface 18 has the same diameter as that of the associated pane 14. By way of example, the diameter of the inner pane 14 may be 5 inches and the distance between the inner and outer panes may be 0.1 inch. The concave surface 18 may, for example, have a radius of 32 inches. This lens radius may be modified according to particular requirements. Preferably the inner pane 14, lens and prism 16 are a monolithic structure. Moreover, it is also possible to make the pane 14 and prism 16 separately and to optically join them subsequently.

As shown particularly in FIGS. 3 and 4, the two window panes 11 and 14 of course have to be sealed to the door 10. To this end, there may be provided a seal 20 of a suitable material such as rubber or plastic. The seal, of course, is circular in outline. It has a central portion 21 for spacing the two panes 11 and 14 and two outer portions 22 and 23 surrounding the two panes 11 and 14 at their outer rims 24 and 25. The composite window of the invention is held together by a plurality (such as four) of retainer clips 27 which, in turn, are secured to a metal frame 28, shown particularly in FIG. 4.

As shown particularly in FIGS. 1 and 2, there may be provided a suitable alignment means in the inner pane 14. This may, for example, consist of two alignment holes 30 and 31 in the inner pane 14. As shown by the 40° angle in FIG. 1, the prism for the forward door may be aligned 40° aft from the vertical. On the other hand, the prism for the aft door may be aligned 40° forward from the vertical. As explained before, this alignment angle has been selected to improve the viewing angle toward the engine and wing fuel cell areas. However, it will be understood that the prism 16 may be aligned in any desired direction.

The mode of operation of the composite window of the present invention may now be explained in connection with FIG. 5, to which reference is now made. As shown in the Figure, the angle of the half prism 16 may, by way of example, be 28°. The normal to the prism 16 is shown by the line 34 and the line of sight by the dotted line 35. The line of sight 35 forms an angle a with the normal and this angle may, for example, be 17°. The light ray 35 continues into the prism 16 as shown by the line 36. The line 36 forms an angle b with the normal 34. This angle b is 11.3°.

According to Snell's law, the sines of the angles a to b are as the indices of refraction of the air and the material of prism 16. Accordingly, sine 17°/sine 11.3 equals 0.292/0.196 equals 1.49. Since the index of refraction of air is 1, 1.49 is the index of the material of prism 16, such as a transparent plastic. The indices of glass may vary between 1.5 and 1.9. It will be understood that any optically transparent material having different indices of refraction may be used for the prism 16, such as various kinds of glass, or transparent plastic substances, and the like. The corresponding angles can be readily determined from Snell's law.

The light ray 36 leaves the inner pane 15, as shown by the light ray 37. The total deviation provided by the prism 16, measured between the normal 38 to the surface 15 and the light ray 37 is 70.7°, and the additional deviation provided by the negative lens defined by the surface 18 is an additional 2.5°, making a total of 73.2°. However, the actual deviation, due to the prism 16, is only 25.7°, or 73.2° minus 45° to minus 2.5°.

The angle of 28° for the prism is given only by way of example and may be varied in accordance with requirements, the index of refraction of the prism and the desired downward viewing angle.

Thus, when the true index of refraction of the prism 16 is increased due to a different material, the deviation due to the prism is also increased. As the prism angle, the optical angle, is increased, the angle of the line of sight 35 may also change.

Figure 6:
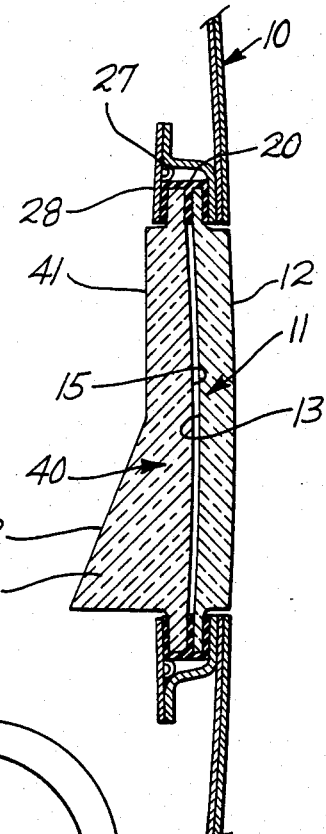
FIG. 6 is a sectional view similar to that of FIG. 3 but showing the inner pane being partially flat and partly in the shape of a prism.

As previously indicated, it is not necessary that the prism 16 extend over the entire surface of the inner pane 14. This is illustrated in FIG. 6, to which reference is now made. Here an inner pane 40 has an upper surface 41 which is plane and parallel to the surface 15. However, the lower surface 42 forms a prism 43. Otherwise the embodiment of FIG. 6 operates in the same manner as that of FIG. 3, for example.

Figure 7:
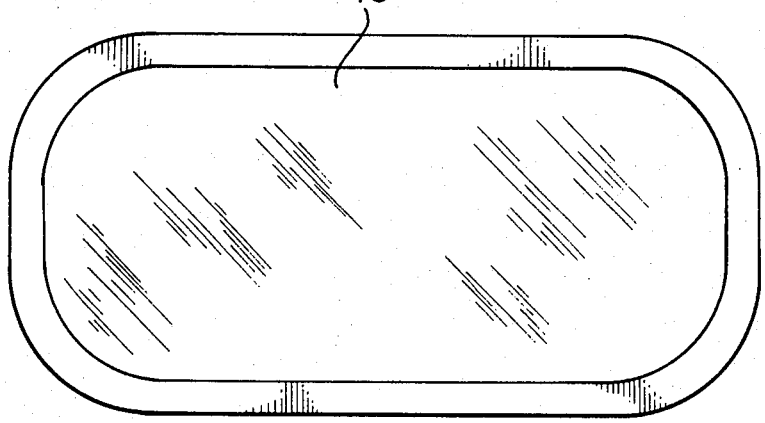
FIG. 7 is a front view of a modified window of substantially rectangular outline.

Instead of using a composite window with a circular outline, it is also feasible to provide a window with a substantially rectangular outline. This is shown in FIG. 7, to which reference is now made, where the composite window 45 is elongated and generally forms an oval. In other words, it is a rectangle with rounded corners.

There has thus been disclosed a composite window suitable for the entrance doors of a vehicle such as those of an airplane. The window includes an outer pane which may simply be a glass plate, or other optically transparent plate. The inner pane, which is spaced from the outer pane, includes a prism extending into the interior of the vehicle. The prism may be adjusted or aligned so that the line of sight is not necessarily a beam or straight out (and downward), but in a predetermined forward or aft direction. Additionally, the outer pane may be provided with a concave surface forming a concave, or negative, lens. This lens enhances the optical deviation afforded by the prism. The composite window of the invention may be fitted into any vehicle door in the manner indicated by FIG. 8 in which an entrance door 10 is shown closed into the fuselage wall 47 of an airplane. The composite window is seen to include the outer pane 11 with its external surface 12 disposed essentially flush with that of the fuselage wall 47. The inner pane with a prism configuration is indicated at 14.

What is claimed is:

1. A composite window for an entrance door of an airplane including at least one substantially air-tight door comprising:
   a. an outer pane of a transparent material and having two substantially parallel plane surfaces;
   b. an inner pane of a transparent material, said inner pane having a first surface facing said outer pane and spaced from said outer pane and being shaped to provide a concave negative lens having substantially the same area as said inner pane, and said inner pane having an opposite surface, at least a portion thereof forming a prism oriented to afford a view outside the airplane in a predetermined direction; and
   c. means for sealing at least said outer pane substantially air-tight to the door.

2. A composite window for an entrance door of an airplane including at least one substantially air-tight door comprising:
   a. an outer pane of a transparent material and having two substantially parallel plane surfaces;
   b. an inner pane of a transparent material, said inner pane having a first surface facing said outer pane and spaced from said outer pane, and said inner pane having an opposite surface, at least a portion thereof forming a prism extending over the entire area of said opposite surface and oriented with its broad base in a substantially downward direction oriented to afford a view outside the airplane in a predetermined direction;
   c. means for sealing at least said outer pane substantially air-tight to the door; and d. alignment means provided on said inner pane for orienting said prism in a predetermined slightly forward or slightly aft direction.

3. A composite window for an entrance door of an airplane including at least one substantially air-tight door comprising:
   a. an outer pane of a transparent material and having two substantially parallel plane surfaces;
   b. an inner pane of a transparent material, said inner pane having a first surface facing said outer pane and spaced from said outer pane, and said inner pane having an opposite surface, at least a portion thereof forming a prism oriented to afford a view outside the airplane in a predetermined direction; and
   c. means for sealing at least said outer pane substantially air-tight to the door;
   both of said panes being disc-shaped and having a circular outline.

4. A composite window for an entrance door of an airplane including at least one substantially air-tight door comprising:
   a. an outer pane of a transparent material and having two substantially parallel plane surfaces;
   b. an inner pane of a transparent material, said inner pane having a first surface facing said outer pane and spaced from said outer pane, and said inner pane having an opposite surface, at least a portion thereof forming a prism oriented to afford a view outside the airplane in a predetermined direction; and
   c. means for sealing at least said outer pane substantially air-tight to the door;
   both of said panes having a substantially elongated and oval outline.

5. A composite window for an entrance door of an airplane including at least one substantially air-tight door comprising:
   a. an outer pane of a transparent material and having two substantially parallel plane surfaces;
   b. an inner pane of a transparent material, said inner pane having a first surface facing said outer pane and spaced from said outer pane, and said inner pane having an opposite surface, at least a portion thereof forming a prism oriented to afford a view outside the airplane in a predetermined direction; and
   c. means for sealing at least said outer pane substantially air-tight to the door;
   said inner pane having a first surface shaped to provide a concave negative lens, said lens having substantially the same area as does said inner pane;
   said prism having an index of refraction of about 1.49 and an inclination of substantially 28 degrees and having a line of sight making an angle of approximately 45° with the normal to said opposite surface and providing an angle measured between a normal to said parallel plane surface and the ray from said line of sight to the outside of approximately 73 degrees.

* * * * *